United States Patent [19]

Look et al.

[11] 4,019,945

[45] Apr. 26, 1977

[54] STRIP APPLYING DEVICE

[75] Inventors: Thomas F. Look, New Brighton; Richard T. Podvin, Fridley; Carlyle A. Weigel, Maplewood, all of Minn.

[73] Assignee: Minnesota Mining and Manufacturing Company, St. Paul, Minn.

[22] Filed: Mar. 10, 1976

[21] Appl. No.: 665,411

[52] U.S. Cl. .............................. 156/405; 156/116; 156/252; 156/584

[51] Int. Cl.² ................. B29H 17/20; B29H 21/02

[58] Field of Search .......... 156/116, 130, 252, 253, 156/344, 361, 506, 405, 522, 537, 543, 545, 577, 584, 289

[56] References Cited

UNITED STATES PATENTS

| | | | |
|---|---|---|---|
| 2,776,068 | 1/1957 | Johnson | 156/522 |
| 3,053,723 | 9/1962 | Plach et al. | 156/361 |
| 3,193,430 | 7/1965 | Messmer et al. | 156/361 |
| 3,411,975 | 11/1968 | Rowe | 156/405 |
| 3,447,992 | 6/1969 | Allen et al. | 156/361 |
| 3,595,724 | 7/1971 | Leblond | 156/405 |
| 3,647,126 | 3/1972 | Dieterich | 156/405 |
| 3,899,383 | 8/1975 | Schultz | 156/130 |
| 3,944,457 | 3/1976 | Podvin et al. | 156/116 |

*Primary Examiner*—Charles E. Van Horn
*Assistant Examiner*—John E. Kittle

*Attorney, Agent, or Firm*—Cruzan Alexander; Donald M. Sell; William L. Huebsch

[57] ABSTRACT

A device including means for removing a protective liner from elastic reflex-light reflective strip material, means for applying a length of the strip material to a tire casing, and means for separating the applied length from a supply length of the strip material. The means for removing the liner includes means in driving engagement with the liner, the speed of which can be varied via rotation of a helical strip to match the rate of strip application. Rotation of the helical strip is caused by movement along the strip of a carriage on which the liner is separated from the strip, which movement of the carriage is caused by the accumulation or decrease in the amount of liner between the carriage and liner drive means when the ratio of liner movement to strip movement increases or decreases. The means for separating the applied length of strip material includes means for perforating the strip material at a location related to the leading end of the applied length, and means activated after the strip material is applied at the perforation for clamping the strip material in the device and pulling the supply length of strip material away from the applied length so that they separate at the perforation.

8 Claims, 6 Drawing Figures

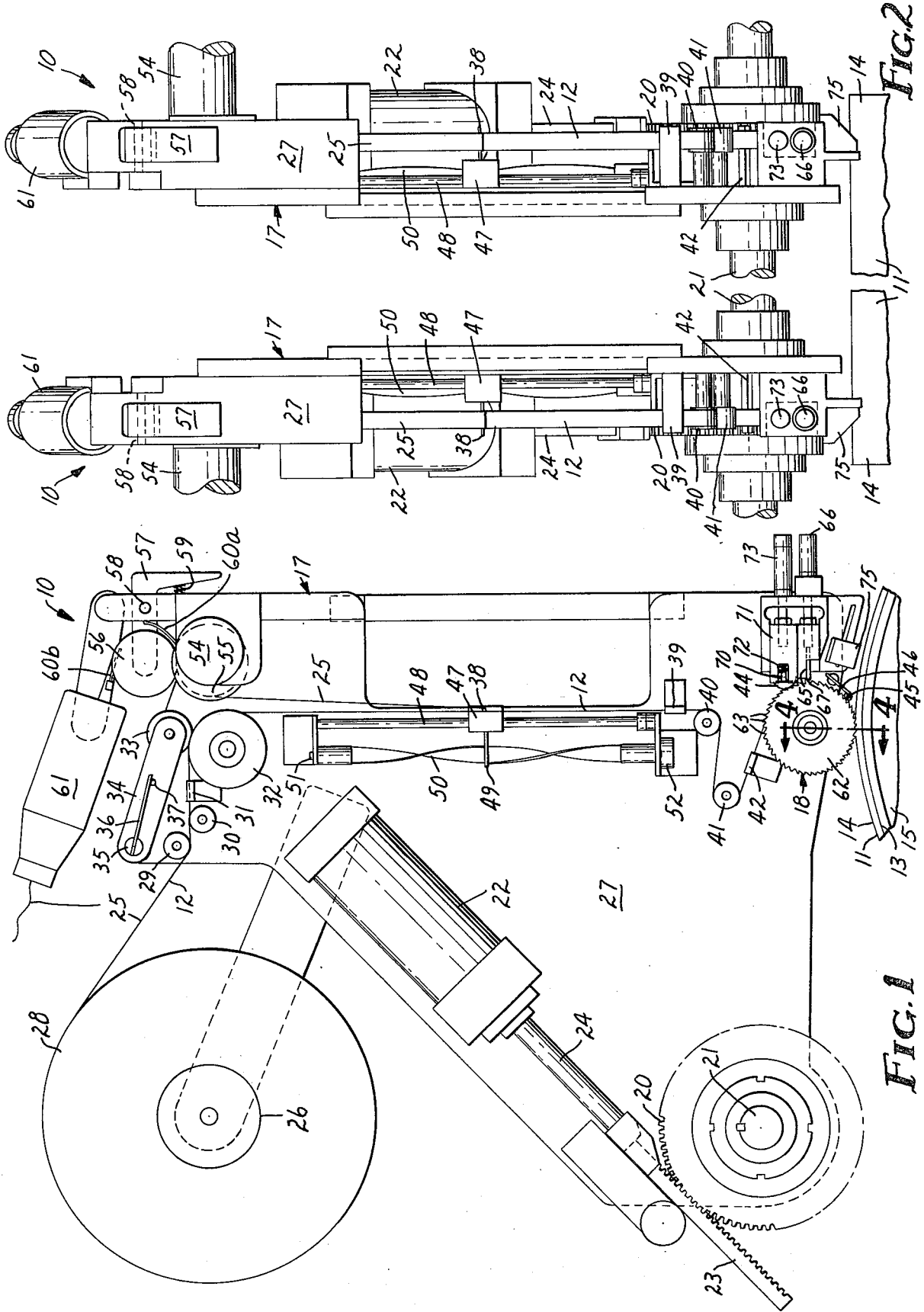

STRIP APPLYING DEVICE

BACKGROUND OF THE INVENTION

1. Field of the Invention

The present invention relates to devices for applying strips of material to a surface, and in one aspect to devices for applying strips of reflex-light reflective material around tire casings.

2. Description of the Prior Art

Tires including reflex-light reflective strips around their sidewalls (as taught in U.S. Pat. No. 2,382,908) have found particular acceptance for use on bicycles and motorcycles to provide a measure of safety when the cycle is operated after dark. Such tires are typically constructed by adhering parallel strips of an uncured elastomer (such as neoprene or natural rubber) supporting a layer of reflex-light reflective elements to the outer surface of an unvulcanized tire casing. The tire casing is then vulcanized in a tire mold to form a completed tire having a U-shaped cross section with tread, embossed brand and size information and the strips permanently incorporated in its sidewalls.

Known prior art devices for applying such strip material to an unvulcanized tire casing includes the device illustrated in Drawing No. TR-175 which is available from the Special Enterprises Department of Minnesota Mining and Manufacturing Company, Saint Paul, Minn., and the devices described in U.S. Pat. Nos. 3,899,383 and 3,944,457. These devices work well for the application of reflective strip material to bicycle tires. They are not as suitable for the application of reflective strip material to motorcycle tires, however. The greater width of such strips (e.g. ½ inch as opposed to 3/16 inch for bicycle tires) dictates the use of a more positive liner removal means than these devices provide. Also the reflex-light reflective elements in strip material for use on motorcycle tires are coated with a protective layer (e.g. latex) which protects the reflex-light reflective elements from being coated with a dark paint-like mold release agent sprayed over the tire before it is placed in the tire mold and prevents degradation of the reflectivity of the elements which occurs if they are exposed during the molding process. This protective layer (which is stripped away after the tire is molded) causes much greater sliding friction than the surface of the elements themselves which element surface is exposed on the strips used in the aforementioned devices. Thus a device for applying such strip material to motorcycle tires should make no sliding contact with the protective layer and yet must accurately guide the strip material to insure that the edges of the applied strip will be straight and parallel and will be closely aligned (e.g. within 0.030 inch) when the ends of the applied strip meet so that the strips will be smoothly concentric after the tire is molded. Also the device must have a highly accurate system for providing the amount of overlap of the ends of the applied strips (e.g. no more than ⅛ inch) to insure a proper appearance of the strips at their ends in the molded tire.

SUMMARY OF THE INVENTION

According to the present invention there is provided a device for applying strips of reflex-light reflective material to a tire casing rotated past the device, which device provides a very positive, yet inexpensive and mechanically simple means for separating a liner from the strip material, provides means for accurately guiding the strip material without making sliding contact with the protective coating over the reflex-reflective elements, and provides means for separating the applied length of strip material from a supply length of strip material in the device to provide a highly accurate overlap for ends of the strip.

The means for removing the liner from the strip material includes variable speed liner drive means in driving engagement with the liner. The liner drive means are activated proportionally to the rate of movement of the strip material through the device by means including a carriage movable along the path for the strip material and carrying a small diameter roller about which the liner is separated from the strip material. The carriage is biased so that it will move along the path for the strip material to straighten the liner between the carriage and the liner drive means upon lengthening or shortening of that length of liner caused by increases or decreases in the ratio of the speed at which the strip material is being applied to the speed at which the liner drive means is pulling liner away from the strip material. The carriage carries members which rotate a helical strip upon such movement to respectively increase or decrease the speed of the liner drive means and thereby provides a feedback loop for matching the speed of the liner drive means to the speed at which the strip material is being applied.

The means for separating the applied length of strip material includes means for perforating the strip material at a precisely predetermined location, and after the strip is applied at the perforation, for clamping the strip material on the device and pulling it away from the tire causing to separate the strip material at the perforation.

BRIEF DESCRIPTION OF THE DRAWING

The present invention will be further described with reference to the accompanying drawing wherein like numbers refer to like parts in the several views, and wherein:

FIG. 1 is a vertical side view of a device according to the present invention for applying strip material;

FIG. 2 is a vertical front view of a pair of the devices of FIG. 1;

DESCRIPTION OF THE PREFERRED EMBODIMENT

Figure 3:
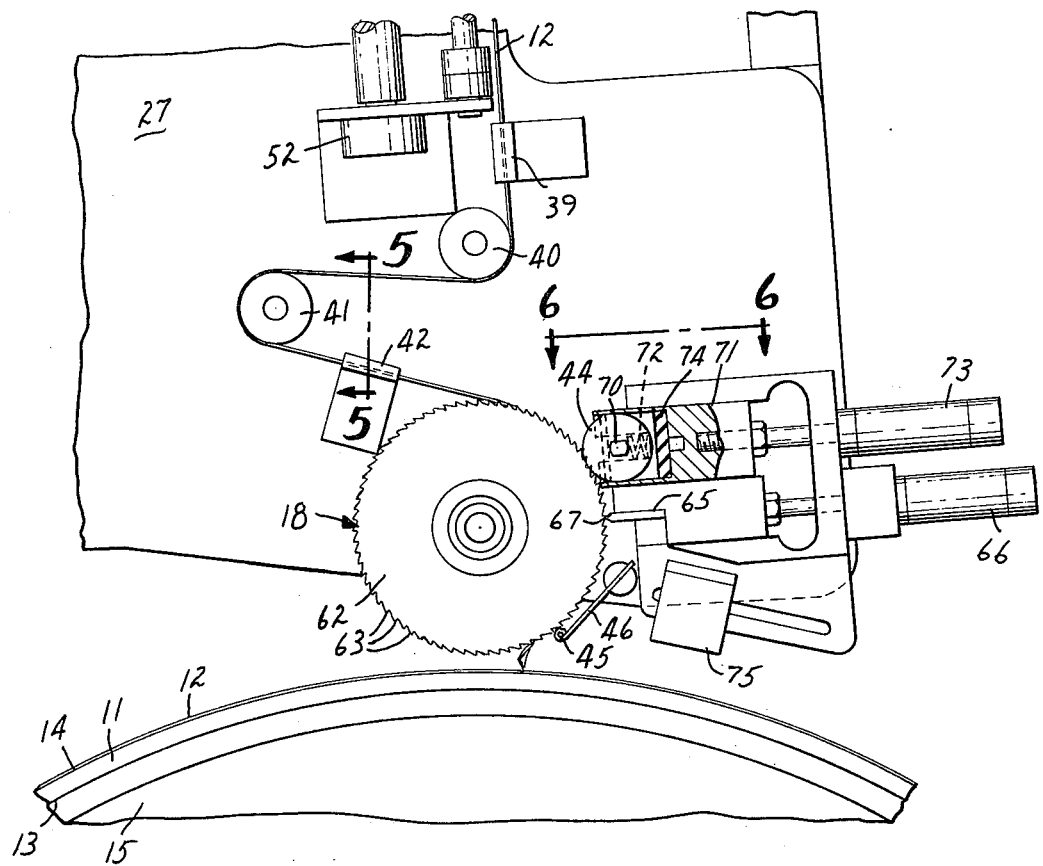
FIG. 3 is an enlarged fragmentary view, partially in section, of the area around an applying wheel on the device of FIG. 1.

Referring now to FIG. 1 of the drawing there is illustrated a device according to the present invention generally designated by the numeral 10.

The device 10 is adapted for use with means (not shown) for driving an unvulcanized tire casing 11 along a predetermined path, and two of the devices 10 (one of which is the mirror image of the other) may be used as shown in FIG. 2 to apply spaced parallel lengths of a reflex-reflective strip material 12 to the tire casing 11.

As illustrated the tire casing 11 to which the strip material 12 is applied is an unvulcanized motorcycle tire comprising a continuous belt-like length of cord and synthetic or natural rubber, having at each edge an inwardly projecting bead 13 (FIG. 4) and a continuous outer surface 14 which will be formed into the tread and sidewalls of the motorcycle tire in the vulcanizing process. The casing 11 is supported on a circular tire building wheel 15 adapted to receive and support the tire casing 11 in a taut condition.

The device 10 includes a head assembly 17 mounted for pivotal movement about a fixed rod 21 between a spaced position spaced from the tire building wheel 15 to afford changing the tire casing 11 on the tire building wheel 15, and an applying position (FIG. 1) at which a strip applying wheel 18 rotatably mounted on the head assembly 17 is positioned to press the strip material 12 into engagement with the tire casing 11. Means are provided for moving the head assembly 17 between its spaced and applying positions comprising a circular gear 20 fixed to the rod 21, and an air cylinder 22 mounted on the head assembly 17 and having a rack 23 attached to the end of its piston rod 24 and engaged with the gear 20. Upon proper activation, the air cylinder 22 can cause rotation of the head assembly 17 between its spaced and contact positions.

The device 10 includes means for supporting a supply length of the strip material 12 covered on one major surface by a protective liner 25, means for defining a path for an end of the supply length of strip material 12 to the applying wheel 18, and means along the path for removing the protective liner 25 from the strip material 12 comprising means in driving engagement with the liner 25 and means for operating the means adapted for driving engagement with the liner 25 at a rate generally equal to the rate at which the strip material 12 is being applied to the tire casing 11.

The device 10 includes a reel support mechanism 26 mounted on a frame 27 of the head assembly 17 which releasably engages and rotatably supports a reel 28 wound with a supply length of the strip material 12 along one side surface of which lies the protective liner 25, and the other side surface of which is defined by a protective coating (e.g. latex) covering reflex-light reflective elements incorporated in the strip material 12.

The reel support mechanism 26 includes a light frictional clutch which prevents overrunning of the reel 28 and spillage of the strip material 12 during the application cycle of the strip material 12.

From the reel 28 the strip material 12 extends between first and second guide rollers 29 and 30 rotatably mounted on the frame 27, and through an opening in a first edge guide assembly 31 fixed to the frame 27. From the first edge guide assembly 31 the strip material 12 extends partially around a tensioning wheel 32 rotatably mounted on the frame 27 by an adjustable clutch to afford providing a predetermined level of tension in the strip material 12 being applied. The strip material 12 is pressed into frictional engagement with the tensioning wheel 32 to insure such tension by a pressure roller 33 rotatably supported on an arm 34 privotably mounted on the frame 27 at a slotted pin 35 fixed to the frame 27. The arm 34 is biased so that the pressure roller 33 will press the strip material 12 against the tensioning wheel 32 by a leaf spring 36 having one of its ends in the slot in the pin 35 and its other end supported against a pin 37 projecting from the arm 34. From the tensioning wheel 32 the strip material 12 extends along a linear portion of its path and passes adjacent a stripping roller 38 of a very small diameter (e.g. 0.090 inch diameter), included in a liner stripping assembly and around which stripping roller 38 its liner 25 is peeled away at an angle of about 180°. Then the strip material 12 extends through a slot in a second edge guide assembly 39 fixed to the frame 27 around third and fourth cylindrical guide rollers 40 and 41 rotatably mounted on the frame 27, through a slot in a third edge guide assembly 42 and to the strip applying wheel 18. The fourth guide roller 41 and the third edge guide assembly 42 are positioned to direct the strip material 12 onto the strip applying wheel 18 at a position spaced about 180° from the position at which the strip applying wheel 18 presses the strip material 12 into engagement with the tire casing 11. The resulting wrap of the strip material about the applying wheel 18 adds stability to the guiding of the strip material 12 by the strip applying wheel 18, and facilitates the functioning of the strip material separating means as will later be explained.

Figures 4, 5:
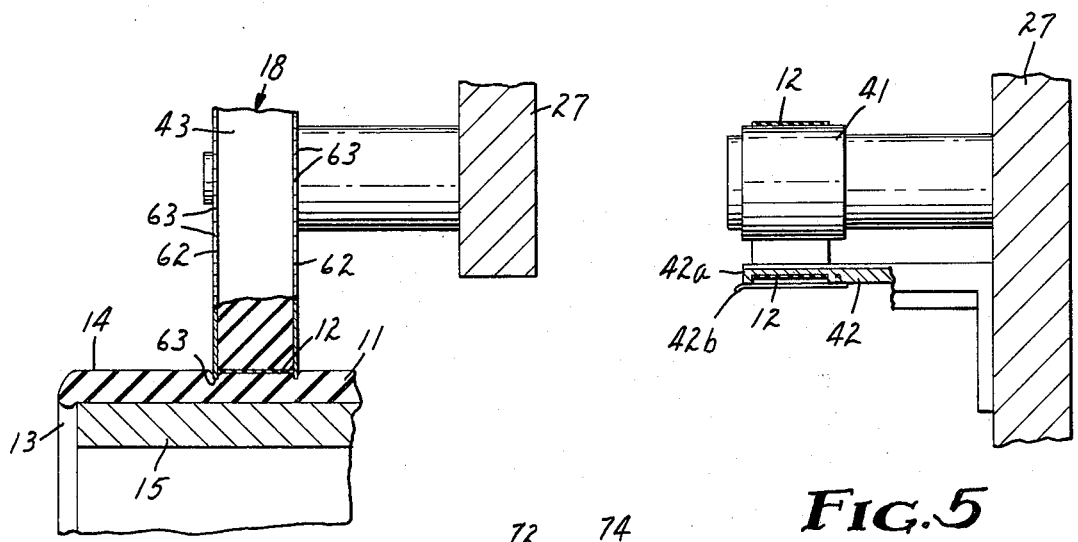
FIG. 4 is an enlarged fragmentary sectional view taken approximately along line 4—4 of FIG. 1.
FIG. 5 is an enlarged fragmentary sectional view taken approximately along line 5—5 of FIG. 3.
Figure 6:
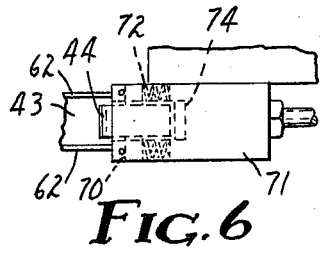
FIG. 6 is a fragmentary sectional view taken approximately along line 6—6 of FIG. 3.

FIG. 5 best illustrates the structure of the third edge guide assembly 42 which guides the strip material 12 onto the strip applying wheel 18 and has the same structures as the first and second edge guide assemblies 31 and 39. The opening through the edge guide assembly 42 is defined by a slotted blocklike portion 42a thereof which has walls closely spaced from the edges of the strip material 12 (e.g. spaced for about 0.008 inch edge clearance). The opening walls disposed adjacent the major surfaces of the strip material 12 provide a significantly greater clearance from the strip material, however, (e.g. 0.035 inch) so that the major surfaces of the strip material 12 will not drag along the edge guide assembly 42 and so that splices in the strip material 12 may pass through the opening. One of these walls is provided by the block-like portion 42a, and the other by a platelike portion 42b of spring material which can be manually deflected at a projecting end portion to afford inserting the strip material 12 edgeways into the edge guide assembly 42.

FIGS. 3 and 4 best illustrate the strip applying wheel 18, which has an axially central portion defining a cylindrical peripheral surface 43 along which the strip material 12 extends between the surface 43 and a clamping roller 44 (the function of which clamping roller 44 will be explained later) and a positioning roller 45. The positioning roller 45 is rotatably mounted on one end of a spring 46. The spring 46 is supported on the frame 27 at its opposite end to bias the positioning roller 45 against the periphery 43 of the applying wheel 18 at a position closely adjacent the position at which the strip applying wheel 18 presses the strip material 12 against the tire casing 11. Thus the positioning roller 45 will properly position an end of the strip material 12 extending past the positioning roller 45 for engagement with a tire casing 11 under the strip applying wheel 18 as the head assembly 17 is moved to its applying position. Two coaxial circular flanges 62 (e.g. circular saw blades) flank the central portion of the applying wheel 18 and have closely spaced teeth 63 which project between 0.015 inch and 0.040 inch radially beyond the peripheral surface 43. The teeth are oriented to engage the tire casing and without permanently scoring the tire casing 11, to both provide a positive driving engagement between the tire casing 11 and the strip applying wheel 18 and to provide edge guiding flanges which prevent the strip material 12 from moving edgewise from beneath the peripheral surface, even though the applying wheel 18 is forcefully pressed against the tire casing 11 to apply pressure full width across the strip material 12 and applies uneven pressure transversely across the strip material 12 because of transverse unevenness in the surface 14 of the tire casing 11.

The liner stripping mechanism, best seen in FIGS. 1 and 2, consists of a rectangular carriage 47 on which the small diameter stripping roller 38 is rotatably mounted. The carriage 47 is slidably mounted on a rod 48 fixedly mounted on the frame 27 axially parallel to and extending along the linear path for the strip material 12 between the tensioning wheel 32 and the third guide roller 40. The liner can be stripped around the stripping roller 38 at any position between a first and a second position of the carriage 47, which first and second positions are defined by the ends of the rod 48 respectively adjacent the tensioning wheel 32 and the third guide roller 40. Fixed to the carriage 47 are two parallel driving pins 49 projecting at a right angle to the roller 38. The driving pins 49 engage opposite major helical surfaces of a rigid strip 50 twisted along its length and mounted for rotation about an axis parallel to the rod 48 and linear path portion for the strip material 12 via a bearing 51 at one end and the rotary actuator of a potentiometer 52 at the other. The potentiometer 52, through an amplifying system, controls power input to a variable speed motor 54 which drives a flanged liner drive wheel 55 to which the liner 25 extends from the stripping roller 38 along a path generally parallel to the adjacent path of the strip material 12. A pressure wheel 56 is rotatably mounted on one end of an L-shaped arm 57, which arm 57 is pivotably mounted on the frame 27 at a pin 58, and the pressure wheel 56 is biased by a spring 59 to press the liner 25 being removed into driving engagement with the flanged liner drive wheel 55. The end of the L-shaped arm 57 opposite the pressure wheel 56 is positioned to afford manually moving the pressure wheel 56 away from the liner drive wheel 55 to thread the liner 25 therebetween. A first curved wire guide 60a is fixed at one end to the frame 27 and extends partially around the pressure wheel 56 and into an axially centered circumferential groove in the liner drive wheel 55 to insure movement of the liner around the pressure wheel 56. From the pressure wheel 56 the liner 25 passes along a second curved wire guide 60b fixed at one end to the frame 27 and extending into a circumferential groove in the pressure wheel 56, and through a venturi 61 through which air flows to expel the liner 25 through a tube to a waste container (not shown).

Movement of the carriage 47 along the rod 48 toward its second position and away from the liner drive wheel 55 rotates the twisted strip 50 and potentiometer 52 to increase the speed of the motor 54 and thereby the speed at which the liner 25 is driven away from the strip material 12 around the finger 40; whereas movement of the carriage 47 toward its first position and the liner drive wheel 55 rotates the twisted strip 50 and potentiometer 52 in the opposite direction to decrease the speed of the motor 54 and thereby the speed at which the liner 25 is driven. When the head assembly 17 is in its applying position, the rod 48 is oriented approximately vertical (see FIG. 1). When the rate at which the strip material 12 is being applied increases, the length of liner 25 between the carriage 47 and the liner drive wheel 55 at first increases since the rate at which the liner 25 is being driven away is not immediately changed. The weight of the carriage 47 provides means for biasing it away from the liner drive wheel 55 so that it will then move toward its second position to straighten the increasing length of liner 25 between the carriage 47 and liner drive wheel 55. Movement of the carriage 47 toward its second position, however, will increase the speed of the motor 54, and thus the rate at which the liner 25 is being driven from the machine so that the length of liner 25 accumulated between the carriage 47 and the liner drive wheel 55 decreases resulting in the carriage 47 being lifted toward its first position and rotating the strip 50 to cause a corresponding decrease in the speed of the motor 54. Conversely, when the rate at which the strip material is being applied decreases, the length of liner 25 between the carriage 47 and the liner drive wheel 55 at first decreases, and the carriage 47 is lifted toward its first position, which rotates the twisted strip 50 to decrease the speed of the motor 54, resulting in more accumulation of liner 25 between the carriage 47 and liner drive wheel 55 and an increased motor 54 speed. For each speed of withdrawal of strip material 12 by a tire casing 11 to which it is being applied, the carriage 47 will thus seek a position at which the speed will be matched by the speed at which the liner 25 is being driven from the strip material 12 by the liner drive wheel 55.

The device also includes means for separating a length of the strip material 12 which has been applied to a tire casing 11 from the supply length of strip material 12 comprising means for perforating the strip material 12 as it passes around the applying wheel 18, means for clamping the strip material 12 against the applying wheel 18, and means for activating the perforating means, clamping means and head assembly 17 positioning means to sequentially (1) perforate the strip material 12, (2) move the head assembly 17 toward its spaced position after the portion of the applied strip material adjacent the perforation has moved into contact with the tire casing 11, and (3) clamp the strip material 12 to the applying wheel 13 during movement of the head assembly 17 toward its spaced position to pull the strip material 12 apart at the perforation.

The means for perforating the strip material 12 comprises a knife 65 mounted at the end of the piston on an air cylinder 66 for movement generally radially of the applying wheel 18 between a retracted position with the edge 67 of the knife spaced from the strip material 12, and an engage position with an edge 67 of the knife 65 pressed through the strip material 12 along the periphery of the applying wheel 18. The edge 67 of the knife 65 is adapted to have a width which is slightly more narrow than the width of the strip material 12 so that engagement of the knife 65 with the strip material 12 will transversely perforate, but not totally sever, the strip material 12 and that the portions of the strip material 12 on both edges of the perforation will still attach the strip material 12 across the perforation with sufficient strength to guide the supply length of strip material to the tire casing 11 and to help pull the strip material 12 along its path. The long length of contact between the strip material 12 and the peripheral surface 43 of the strip applying wheel 18 from the knife 65 to the point at which the strip material 12 first contacts the applying wheel 18 also helps to pull the strip material 12 along the path against the tension applied thereto through the tensioning wheel 32, which tension might otherwise separate the strip material 12 at the perforation. A control system on the device pulses the cylinder 66 and knife 65 with sufficient rapidity that engagement of the knife 65 with the strip material 12 as it is being applied will not tear apart the moving strip material 12.

The means for clamping the strip material 12 along the path comprises the clamping roller 44 which is rotatably mounted on a shaft 70 flatted on both sides via a one-way clutch which only permits rotation of clamping roller to afford movement of the strip material toward the tire casing 11. The ends of the shaft 70 extend through aligned slots in parallel projecting arms on a yoke 71 to position the clamping roller 44 with a portion of its periphery extending beyond the distal ends of the arms. The slots are sufficiently long to afford sliding movement of the shaft 70 in a direction normal to its axis, and springs 72 are provided between the yoke 71 and both ends of shaft 70 to bias the clamping roller 44 into engagement with strip material 12 extending along the periphery 43 of the applying wheel 18. The yoke 71 is fixed to the end of a piston on an air cylinder 73 for movement relative to the frame 27 between a release position with the piston retracted into the air cylinder 73 and the clamping roller 44 biased by the springs 72 into engagement with strip material 12 on the strip applying wheel 18 and freely rotatable for movement of the strip material 12 onto the tire casing 11; and a clamp position at which a pad 74 fixed between the projecting arms of the yoke 71 presses against the side of the clamping roller 44 opposite the strip material 12 to stop rotation of the clamping roller 44 and press it against the strip material 12, thereby clamping the strip material 12 against the applying wheel 18 and preventing movement of the strip material 12 along its path on the head assembly 17.

The control means includes an electric eye 75 adapted to detect the end of the applied length of strip material 12 returning toward the applying wheel 18. Upon a signal from the electric eye 75 that the end of the strip material 12 is returning, a circuit in the control means activates the air cylinder 66 supporting the knife 65 after a predetermined time interval to perforate the strip material 12 so that the leading end and the end adjacent the perforation of the applied length of strip material 12 will overlap slightly. After a further time interval, sufficient that the strip applying wheel 18 has applied the end of the applied strip adjacent the perforation to the tire casing 11, the control means activates the air cylinder 22 supporting the rack 23 to quickly move the head assembly 17 a short distance toward its spaced position. Then, after 40 to 80 milliseconds so that the applying wheel 18 has moved out of engagement with the tire casing 11, the control means activates the air cylinder 73 supporting the yoke 71 to move the yoke 71 to its clamping position and clamp the supply length of strip material 12 against the strip applying wheel 18 via the clamping roller 44, thereby applying pressure to insure that the strip material 12 cannot move through the nip between the applying wheel 18 and clamping roller 44. Subsequent quick movement of the head assembly 17 toward its spaced position sharply tensions the strip material 12 between the head assembly 17 and the tire casing 11, causing it to separate at the perforation. The newly formed leading end of the strip material 12 then projects along the periphery of the applying wheel 18 past the positioning roller 45 (e.g. ½ inch) to a position at which the new leading end of the strip material 12 will be pressed into contact with a new tire casing upon subsequent movement of the head assembly 17 back to its applying position. The control means then slows movement of the head assembly 17 to reduce its momentum while moving it to its spaced position, and deactivates the air cylinder 73. Subsequently the one-way clutch in the clamping roller 44 will retain the position of the strip material 12 along the applying wheel 18 against the tension induced therein by the tensioning wheel 32 and the device 10 is ready for a subsequent application of strip material to a new tire casing.

We claim:

1. In a device adapted for applying lengths of elastic reflex-reflective strip material to tire casings from a supply length of strip material having a protective liner applied thereto, said device comprising means adapted for driving a said tire casing past an applying station; a head assembly including a frame, an applying wheel rotatably mounted on said frame, and means for defining a path for said strip material along said frame including a path portion partially around said applying wheel; means mounting said head assembly for movement between a spaced position spaced from said applying station and an applying position with said wheel positioned to press strip material along the path portion thereon against the tire casing at said applying station to apply strip material as the tire casing is driven past the applying station; and means along said path in advance of said applying wheel adapted for stripping said liner from said strip material, the improvement wherein said means for stripping said liner comprises a stripping finger adapted for guiding said liner around approximately an 180° turn; means mounting said striping finger for movement relative to said frame along a linear path parallel to a linear portion of said path for said strip material with said stripping finger oriented to guide said liner about said turn throughout said linear path for said stripping finger; means adapted for driving engagement with said separated liner; a variable speed motor coupled to said means adapted for driving engagement with said separated liner; means for varying the speed of said motor comprising an actuator rotatable about an axis aligned parallel to said path for said stripping finger, a member fixed to said actuator, said member defining a surface generally helical about said axis and extending along the path for said stripping finger, and means fixed to said stripping finger for providing driving engagement with said helical surface to rotate said member and actuator upon movement of said stripping finger along its path, said actuator being connected to increase the speed of said motor upon movement of said stripping finger along its path toward said applying wheel, and to decrease the speed of said motor upon movement of said stripping finger along its path away from said applying wheel to adjust the rate of speed of said means adapted for driving engagement with said separated liner to the same rate of speed at which the strip material is being applied to said tire casing.

2. A device according to claim 1, wherein said member is a strip twisted along its length, and said means for providing driving engagement comprises parallel pins adapted to move along opposite helical surfaces of said strip.

3. A device according to claim 1, wherein said means for defining a path for said strip material comprises a guide block assembly having walls defining an opening for said strip material through said block assembly, said walls being closely spaced from the edges of strip material to provide edge guiding, and being spaced a significantly greater distance from the major surfaces of said strip material to restrict dragging of said major surfaces on said walls.

4. A device according to claim 1, wherein said applying wheel comprises a cylindrical central portion defining a cylindrical peripheral surface along which said strip material is guided and a plurality of closely spaced pointed teeth projecting radially from and extending entirely around both edges of said cylindrical peripheral surface, and said positioning means is adapted to move said head to said applying position with sufficient force to press the teeth on both edges of said central portion into engagement with a said tire casing despite transverse unevenness of the tire casing so that said teeth provide guide flanges for said strip material being applied.

5. A device according to claim 1, wherein said device further comprises positioning means for moving said head between said spaced and applying positions and means for separating a length of strip material applied to a tire casing from the supply length of strip material, comprising perforating means for perforating said strip material along said path; clamping means for clamping the strip material along said path and means for activating said perforating means, positioning means and clamping means to sequentially perforate said strip material, move said head assembly quickly toward its spaced position after the portion of said strip material being applied adjacent the perforation moves into contact with the tire casing, and clamp said strip material along said path to pull the strip material apart at said perforation upon subsequent movement of said head assembly toward its spaced position.

6. A device according to claim 5, further including means for applying a predetermined tension in said strip material moving along said path and wherein said path portion extends for at least about 180° around said applying wheel and said perforating means is positioned to perforate said strip material adjacent the position at which said applying wheel applies the strip material to a said tire casing to allow frictional engagement between the strip material and said applying wheel over the majority of the engagement therebetween to restrict separating of the strip material at the perforation under the influence of said means for applying a predetermined tension.

7. A device according to claim 5 wherein said means for defining a path for said strip material comprises means for applying a predetermined tension in said strip material moving along said path, a roller pressing said tensioned strip material into engagement with said applying wheel and a one-way clutch mounting said roller to afford movement of said strip material along said path for application to a said tire casing and to prevent movement of said strip material along said path away from said applying wheel under the influence of said means for applying a predetermined tension.

8. A device according to claim 7, wherein said clamping means comprises a pad adapted to engage the surface of said roller opposite said strip material, and means for moving said pad from a position spaced from said roller and an engage position in engagement with said roller to clamp the strip material against the applying wheel.

* * * * *